United States Patent
Deshpande et al.

(10) Patent No.: US 11,315,066 B2
(45) Date of Patent: Apr. 26, 2022

(54) SIMULATING A RETURN NETWORK

(71) Applicant: International Business Machines Corporation, Armonk, NY (US)

(72) Inventors: Ajay Ashok Deshpande, Pleasantville, NY (US); Ali Koc, White Plains, NY (US); Brian Leo Quanz, Yorktown Heights, NY (US); Jae-Eun Park, Dutchess, NY (US); Yada Zhu, Westchester, NY (US); Yingjie Li, Chappaqua, NY (US); Christopher Scott Milite, Southbury, CT (US); Xuan Liu, Yorktown Heights, NY (US); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/740,214

(22) Filed: Jan. 10, 2020

(65) Prior Publication Data
US 2021/0216922 A1    Jul. 15, 2021

(51) Int. Cl.
| G06Q 10/06 | (2012.01) |
| G06Q 10/08 | (2012.01) |
| G06Q 30/02 | (2012.01) |

(52) U.S. Cl.
CPC ..... *G06Q 10/067* (2013.01); *G06Q 10/06393* (2013.01); *G06Q 10/087* (2013.01);
(Continued)

(58) Field of Classification Search
CPC ........... G06Q 10/067; G06Q 10/06393; G06Q 10/0837; G06Q 10/0838; G06Q 10/087; G06Q 30/0205
(Continued)

(56) References Cited

U.S. PATENT DOCUMENTS

| 5,737,581 A | 4/1998 | Keane |
| 6,988,079 B1 | 1/2006 | Or-Bach et al. |

(Continued)

FOREIGN PATENT DOCUMENTS

WO    0201398 A2    1/2002

OTHER PUBLICATIONS

A. Canda, X. Yuan and F. Wang, "Modeling and forecasting product returns: An industry case study," 2015 IEEE International Conference on Industrial Engineering and Engineering Management (IEEM), 2015, pp. 871-875.*

(Continued)

*Primary Examiner* — Timothy Padot
(74) *Attorney, Agent, or Firm* — Patterson + Sheridan, LLP

(57) ABSTRACT

Embodiments herein describe a return network simulation system that can simulate changes in a retailer's return network to determine the impact of those changes. Advantageously, being able to accurately simulate the retailer's return network means changes can be evaluated without first making those adjustments in the physical return network. Doing so avoids the cost of implementing the changes on the return network without first being able to predict whether the changes will have a net positive result (e.g., a positive result that offsets any negative results). A retailer can first simulate the change on the return network, review how the change affects one or more KPIs, and then decide whether to implement the change in the actual return network. As a result, the retailer has a reliable indicator whether the changes will result in a desired effect.

20 Claims, 6 Drawing Sheets

(52) U.S. Cl.
CPC ..... *G06Q 10/0837* (2013.01); *G06Q 10/0838* (2013.01); *G06Q 30/0205* (2013.01)

(58) Field of Classification Search
USPC ...................................................... 705/7.31
See application file for complete search history.

(56) References Cited

U.S. PATENT DOCUMENTS

| | | | |
|---|---|---|---|
| 7,295,990 | B1 | 11/2007 | Braumoeller et al. |
| 7,660,721 | B2 | 2/2010 | Williams et al. |
| 8,156,007 | B1* | 4/2012 | Anthony ............... G06Q 99/00 705/26.1 |
| 8,447,664 | B1 | 5/2013 | Pape et al. |
| 8,533,126 | B1 | 9/2013 | Antony et al. |
| 8,818,884 | B2 | 8/2014 | Marschall et al. |
| 9,697,548 | B1 | 7/2017 | Jaff et al. |
| 10,242,336 | B1 | 3/2019 | Agarwal et al. |
| 10,310,500 | B1 | 6/2019 | Brady et al. |
| 10,318,921 | B1* | 6/2019 | Tilly ..................... G06Q 20/203 |
| 2003/0233246 | A1 | 12/2003 | Snapp et al. |
| 2007/0299791 | A1 | 12/2007 | Mack |
| 2008/0027787 | A1* | 1/2008 | Malsbenden ...... G06Q 30/0631 705/7.29 |
| 2012/0150764 | A1* | 6/2012 | Sadegh ............... G06Q 10/067 705/348 |
| 2013/0346234 | A1* | 12/2013 | Hendrick .......... G06Q 30/0601 705/26.7 |
| 2014/0040248 | A1* | 2/2014 | Walsham ............ G06F 16/9535 707/723 |
| 2014/0278691 | A1 | 9/2014 | Schenken |
| 2016/0063419 | A1* | 3/2016 | Martinez ............. G06Q 10/063 705/7.25 |
| 2016/0292625 | A1* | 10/2016 | Curtland ............. G06F 3/04847 |
| 2016/0321684 | A1* | 11/2016 | Chen .................. G06Q 30/0202 |
| 2017/0287049 | A1 | 10/2017 | Li et al. |
| 2017/0323264 | A1 | 11/2017 | Subramanian |
| 2018/0211206 | A1 | 7/2018 | Baxter et al. |
| 2018/0225623 | A1 | 8/2018 | Mosier et al. |
| 2018/0349846 | A1 | 12/2018 | Sever et al. |
| 2020/0320467 | A1 | 10/2020 | Wu et al. |
| 2020/0402002 | A1 | 12/2020 | Kentris |
| 2021/0049631 | A1 | 2/2021 | Thirunavukkarasu et al. |
| 2021/0065109 | A1 | 3/2021 | Payne et al. |

OTHER PUBLICATIONS

A local algorithm for product return prediction in E-commerce Zhu, Yada; Li, Jianbo; He, Jingrui; Quanz, Brian L.; Deshpande, Ajay A.. IJCAI International Joint Conference on Artificial Intelligence 2018-: 3718-3724. International Joint Conferences on Artificial Intelligence. (2018). Abstract.*

Clear Returns Uses IBM Big Data & Analytics to help retailers predict and understand the impact of returns. M2 Presswire [Coventry] Jul. 3, 2015.*

IBM, "List of IBM Patents or Patent Applications Treated As Related," for U.S. Appl. No. 16/740,214, filed Jan. 10, 2020.

"Shipment policy optimisation in a return supply chain for online retailers via stochastic discrete event simulation," International Journal of Simulation and Process Modelling 11(3)1241-258—Jan. 2016.

Anthropologie, Returns & Exchanges, Oct. 14, 2016, https ://web .archive .org/web/20161014093 7 55/https ://www.anthropologie. com/help/returns-exchanges (retrieved Jun. 10, 2021) (Year: 2016).

Rene B.M. de Koster, Marisa P. de Brito and Masjda A. van de Vendel, How to organise return handling: an exploratory study with nine retailer warehouses, Econometric Institute Report EI 2002-11 .Version Nov. 2001 (Year: 2001).

Chris Lee, 45 Things You Should Know About Reverse Logistics, Jun. 10, 2019, https://www.warehouseanywhere. com/resources/45-things-about-reverse-logistics/ (retrieved Jun. 10, 2021) (Year: 2019).

* cited by examiner

SIMULATING A RETURN NETWORK

BACKGROUND

The present invention relates to simulating a retailer's return network for receiving returned items, and more specifically, to identifying the impact simulated changes have on the return network.

Retailers often have a network of return locations for receiving returned items. For example, retailers that support online sales and also have physical stores can permit a customer to return items either through the mail to a central location or in person at the physical stores. However, the retailer does not have a way to predict how changes in the return network can affect key performance indicators (KPIs) such as return shipping costs, lost sales, gained sales, transfer costs, and the like. Currently, a retailer must make an actual change in the return network (e.g., restrict which items can be returned to which locations, or add a new physical location for receiving returned items) to identify the affect this change has on the KPIs. However, this brute force approach can require a substantial investment and the effect the change often cannot be measured until months later. Thus, what is needed is a simulation system that permits a retailer to simulate changes in their return network in order to identify the impact of those changes.

SUMMARY

One embodiment of the present invention is a method that includes receiving a test parameter defining a change to a return network of a retailer, wherein the return network comprises a plurality of candidate return locations, simulating a plurality of return orders based on the test parameters and the return network by selecting which of the plurality of candidate return locations receive items corresponding to the plurality of return orders where the plurality of return orders are actual orders that were processed by the return network during a historical time period, updating inventories at the plurality of candidate return locations based on simulating the plurality of return orders, predicting virtual sales at the plurality of candidate return locations based on the updated inventories and a demand forecast corresponding to the plurality of candidate return locations where the virtual sales are sales that are predicted to occur during the historical time period if the return network was changed according to the test parameter, and generating one or more key performance indicators (KPIs) based on simulating the plurality of return orders and predicting the virtual sales.

Another embodiment of the present invention includes the embodiment above and where the method includes simulating fulfilling the virtual sales and updating the inventories at the plurality of candidate return locations based on fulfilling the virtual sales. Advantageously, considering the effect of the virtual sales on the inventory provides a more accurate prediction of the effect the test parameters have on the KPIs associated with the return network.

Another embodiment of the present invention includes the embodiments above and where the method includes determining during simulation that one of the plurality of candidate return locations should be replenished based on the updated inventories and updating, after a predefined delay to simulate transit time, the inventories at the plurality of candidate return locations in response to the replenishment. Advantageously, the method recognizes that changing the return network can change the replenishment decisions relative to what was done historically. Thus, simulating the change in the replenishment decisions (and the associated delay) can produce more accurate KPIs.

Another embodiment of the present invention includes the embodiments above and where the method includes determining during simulation that inventory should be transferred from one of the plurality of candidate return locations to another one of the plurality of candidate locations based on the updated inventories and updating, after a predefined delay to simulate transit time, the inventories at the plurality of candidate return locations based on the transfer. Advantageously, the method recognizes that changing the return network can change the transfer decisions relative to what was done historically. Thus, simulating the change in the transfer decisions (and the associated delay) can produce more accurate KPIs.

Another embodiment of the present invention includes the embodiments above and where the method includes predicting a loss of a sale at one of the plurality of candidate return locations based on the updated inventories, wherein the loss of the sale predicts that an actual sale occurring during the historical time period would not have happened if the return network was changed according to the test parameter. Advantageously, identify a loss of sale cause by the change to the return network can have a direct impact on the KPIs relative to the historical performance of the return network.

Another embodiment of the present invention includes the embodiments above and where simulating the plurality of return orders based on the test parameter and the return network, updating inventories at the plurality of candidate return locations based on simulating the plurality of return orders, and predicting virtual sales at the plurality of candidate return locations are performed for each day of the historical time period, wherein the plurality of return orders are actual orders that were processed by the return network during each day of the historical time period. Advantageously, using the actual orders provides a more accurate base for comparing the KPIs generated by the simulator to the historical, actual KPIs for the same time period.

Another embodiment of the present invention includes the embodiments above and where the method includes generating a graphical user interface (GUI) for display comprising graphical images derived from the KPIs, receiving, after generating the GUI, a second test parameter defining a different change to the return network, simulating the plurality of return orders again based on the second test parameters and the return network, thereby generating second KPIs, updating the GUI to display both (i) the graphical images derived from the KPIs and (ii) graphical images derived from the second KPIs for side-by-side comparison. Advantageously, the GUI provides a useful tool for quickly and easily identifying the KPIs and comparing them to KPIs for other simulations, thereby enabling the retailer to make more informed decisions regarding changes to their return network.

DETAILED DESCRIPTION

Embodiments herein describe a return network simulation system that can simulate changes in a retailer's return network to determine the impact of those changes. Advantageously, being able to accurately simulate the retailer's return network means changes can be evaluated without first making those adjustments in the physical return network. Doing so avoids the cost of implementing the changes on the return network without first being able to predict whether the changes will have a net positive result (e.g., a positive result that offsets any negative results). A retailer can first simulate the change on the return network, review how the change affects one or more KPIs, and then decide whether to implement the change in the actual return network. As a result, the retailer has a reliable indicator whether the changes will result in a desired effect.

In one embodiment, the return network simulation system uses historical data corresponding to the return network in order to simulate how a change to the return network would affect one or more KPIs. For example, the return network simulation system may use the return orders for a two month time period to simulate how those orders would be processed if the return network was changed. In addition to considering the return orders, the simulation system can also simulate (or predict) how the change in the return network affects the sales over the same time period. For example, if the return network is changed such that additional return locations are added, or certain items can be returned to only certain locations, this affects how the return orders are routed, and thus, can affect the inventory at the various locations in the return network. Changing the inventory may mean some locations have additional inventory when, in the actual return network, those locations ran out of inventory during the same time period. Thus, there may be additional sales (i.e., predicted sales or virtual sales) because of the change. Conversely, changing the return network may result in a loss of sales (if a location that had inventory during the same time period in the actual return network but runs out of inventory in the simulation). Moreover, the changes in inventory at the locations in the return network caused by simulating a change in the return network can also change replenishment orders or transfers where items are shipped from one location in the retailer's network to another location. Thus, by considering the effect the change to the return network has both on processing returns and on inventory, the return network simulation system can provide an accurate prediction of the impact of the change on the KPIs associated with the return network.

Figure 1:
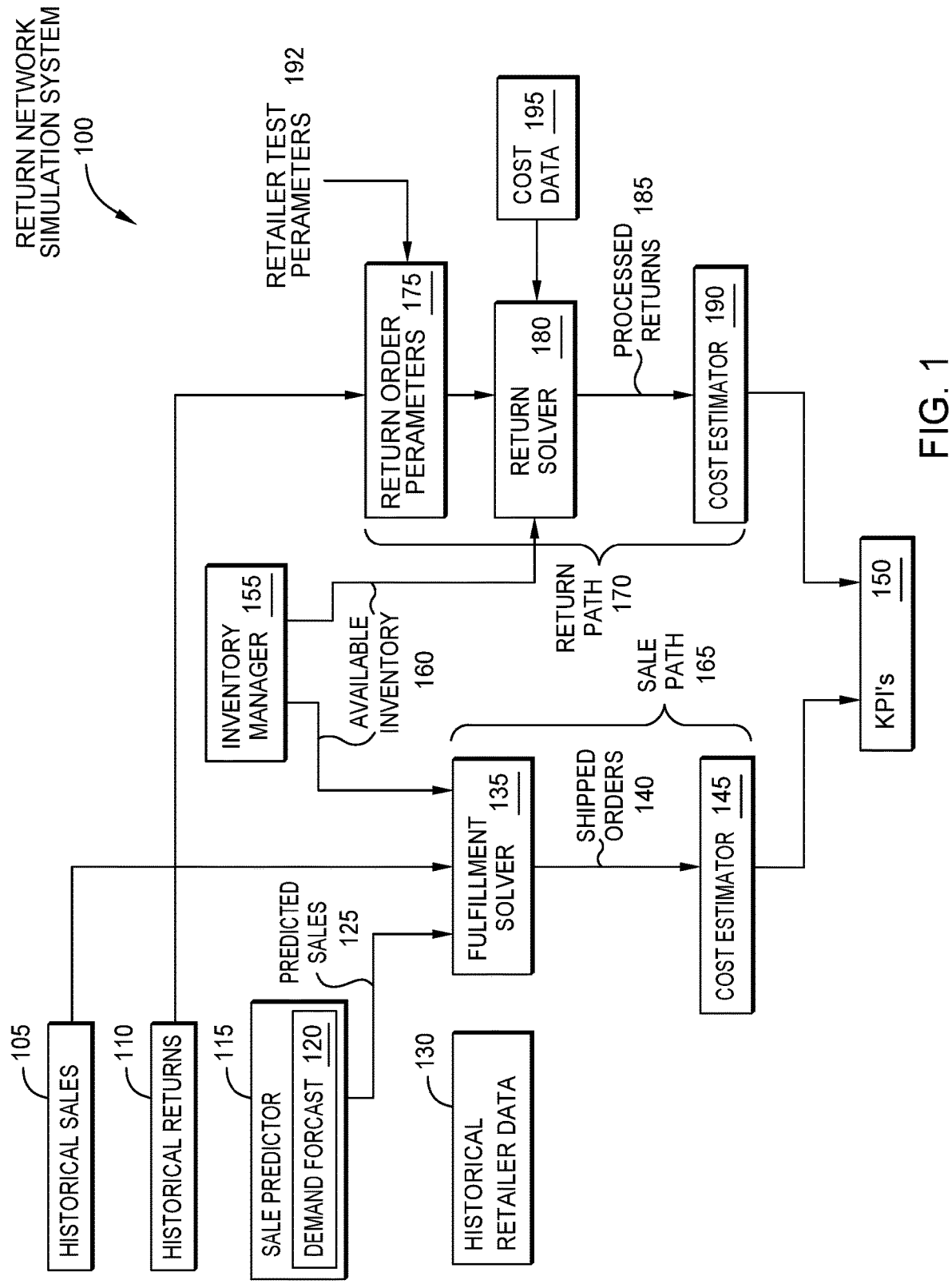
FIG. 1 illustrates a return network simulation system, according to one embodiment described herein.

FIG. 1 illustrates a return network simulation system 100, according to one embodiment described herein. The simulation system 100 includes a sale path 165 for simulating sales during a historical time period and a return path 170 for simulating processed order in response to a change to the return network. The return path 170 includes return order parameters 175 which receive historical returns 110 and retailer test parameters 192 as inputs. The historical returns 110 are the return orders received on a particular day. For example, the return network simulation system 100 may simulate the effect a change has on the retailer's return network for a previous time period (e.g., the months of November and December in 2019). The historical returns 110 can include the number of customer initiated returns for each day for that time period. In one embodiment, the historical returns 110 include only the returns made by mail where the customer ships the item to the return network (in contrast to an in person return where the customer returns the item at a physical store). The simulation system 100 can use the historical (or actual) returns 110 from the previous time period to predict how the KPIs 150 change when the return network is modified.

A retailer can provide the test parameters 192 that simulate a change in the return network. For example, the test parameters 192 can reduce the size of the return network by removing a candidate return location (e.g., a distribution center, a physical store, a kiosk, a re-packaging center, and the like). For example, the retailer may currently have a return network that includes multiple locations scattered across a country. The retailer may want to simulate how removing one or more of those locations from the return network would affect the KPIs 150. In another example, the retailer may currently have a return network that includes only distribution centers but may want to simulate adding physical stores (i.e., stores where the items are displayed and sold to walk-in customers) as candidate return locations in the return network. Alternatively, or in addition to simulating physical changes to the return network, the test parameters 192 can change a return policy of the return network such as requiring that certain items be returned to only certain candidate return locations in the return network. For example, the retailer may want to simulate a change in policy where clothing can be returned to distribution centers and physical stores but electronics can only be returned to distribution centers. In this manner, the test parameters 192 permit the retailer to simulate a change to the return network that affects how the historical returns 110 are processed.

The return order parameters 175 are provided to a return solver 180 which includes logic for determining where the item in the historical returns 110 should be shipped. That is, the return solver 180 selects which location of the plurality of candidate return locations in the return network should receive the item. If this was not a simulation, the return solver 180 would forward the selected location to a returns manager which could then provide a shipping label for the customer that she can use to return the item via the mail. However, during the simulation, it is sufficient for the return solver 180 to identify the selected location.

The test parameters 192 can change the decision made by the return solver 180 in the simulation relative to the decision the actual return solver made when processing the historical return. That is, the logic and configuration of the return solver 180 in the simulation system 100 may be the same logic used by the actual return solver to process the returns 110. However, because the test parameters 192 change the return network, the return solver 180 may select a different location to receive the items in the returns 110 than the actual return solver. For example, the actual return solver may have selected a physical store near to the customer to receive the item; however, the test parameters 192 may have removed that store from the return network, or changed the return policy such that the store is no longer permitted to receive that type of item. Thus, the return solver 180 selects a different location in the return network to receive the item.

The return solver 180 can use cost data 195 to select an optimal location for the item in the returns 110. The cost data 195 can include metrics such as current inventory at the candidate return locations, return capacity at the locations, shipping costs from the customer to the locations, demand imbalances between the locations, and the like. Additional examples of the cost data 195 are provided in FIG. 3. However, the return solver 180 does not need to use cost data 195 to make a decision. For example, the return solver 180 may use predefined rules to determine which of the candidate return locations to select.

The return path 170 includes a cost estimator 190 for estimating the cost of the processed returns 185 generated by the return solver 180. The cost estimator 190 can derive shipping costs, costs for transferring the item to a different location in the return network, costs for re-packing the return item so it can be re-sold, and the like. These costs can then be used to generate the KPIs 150 which can include return shipping costs, lost sales, gained sales, transfer costs, and the like. As discussed later, the KPIs 150 can be provided to the retailer so it can determine whether to make the changes defined in the test parameters 192 to the actual return network.

In one embodiment, changing the manner in which the return solver 180 processes the returns can also change the sales that occur at the retailer. In one embodiment, the simulation system 100 assumes that the historical online sales do not change, while the number of walk-in sales may change. That is, changing the locations where the items are returned (in response to the test parameters 192) affects the inventory at those locations. Thus, while in the actual return network a particular location may have run out of an item, in the simulation, the return solver 180 may funnel more returned items to that location such that the location has more inventory, and thus, can make additional sales to walk-in customers. To predict the change the test parameters 192 have on the sales during the time period, the return network simulation system 100 includes a sale predictor 115 that uses a demand forecast 120 and the available inventory at the retailer's stores to predict walk-in sales 125. In some cases, a change to the return network can result in additional sales, but other changes may result in a loss in sales (e.g., a store runs out of an item in the simulation when it did not in the historical time period). The sale predictor 115 can then send the predicted walk-in sales 125 to a fulfillment solver 135 in the sale path 165. For example, the predicted sales 125 may be a positive number which is added to the historical sales 105 (i.e., the actual sales that occurred during the time period) or a negative number that is subtracted from the historical sales 105.

For the online sales, the fulfillment solver 135 uses logic to select which location (e.g., a distribution center) is used to fulfill the online order. For example, the fulfillment solver 135 may select the location closest to the customer's address, or select the location that has the highest inventory of the item but the lowest demand. Moreover, the location used to fulfill the online orders does not need to be one of the candidate return locations used by the return solver 180.

For walk-in sales, the fulfillment solver 135 simply updates the inventory at that location to reflect the sale. Further, the fulfillment solver 135 may distinguish between historical sales and "virtual" or the predicted sales 125 when storing results since the predicted sales 125 may be more speculative.

A cost estimator 145 can estimate the revenue and cost associated with the shipped orders 140. For example, the cost may be based on the shipping costs while the revenue may be based on the payment received from the sale. The costs and revenue can then be used to calculate the KPIs 150. Advantageously, the return network simulation system 100 includes both a return path 170 for simulating how the changes in the test parameters 192 affect the decisions made by the return solver 180 and a sale path 165 to determine how the changes in the inventory cause by changing the return network affect sales.

The simulation system 100 includes an inventory manager 155 for tracking the inventory at the retailer's various stores and distribution centers. The inventory manager 155 can track the inventory at the candidate return locations in the return network as well as the inventory at locations that are not candidate return locations. In one embodiment, the inventory manager 155 updates the inventory based on the decisions made by the return solver 180 and the fulfillment solver 135. That is, the processed returns 185 will (once the returned items reach their return location) increase the inventory of the locations, while the shipped orders 140 will decrease the inventory. Thus, the inventory manager 155 can track the inventory during the simulation and provide the current available inventory 160 of the locations to the fulfillment solver 135 and the return solver 180 to make their decisions.

Further, the simulation system 100 includes other historical retailer data 130 that can include other information used to execute the simulation such as pricing calendars, initial inventory, zip code to location mappings, and the like. This historical retailer data 130 is not necessary, but can be used by the return solver 180 or the fulfillment solver 135 in some scenarios.

Figure 2:
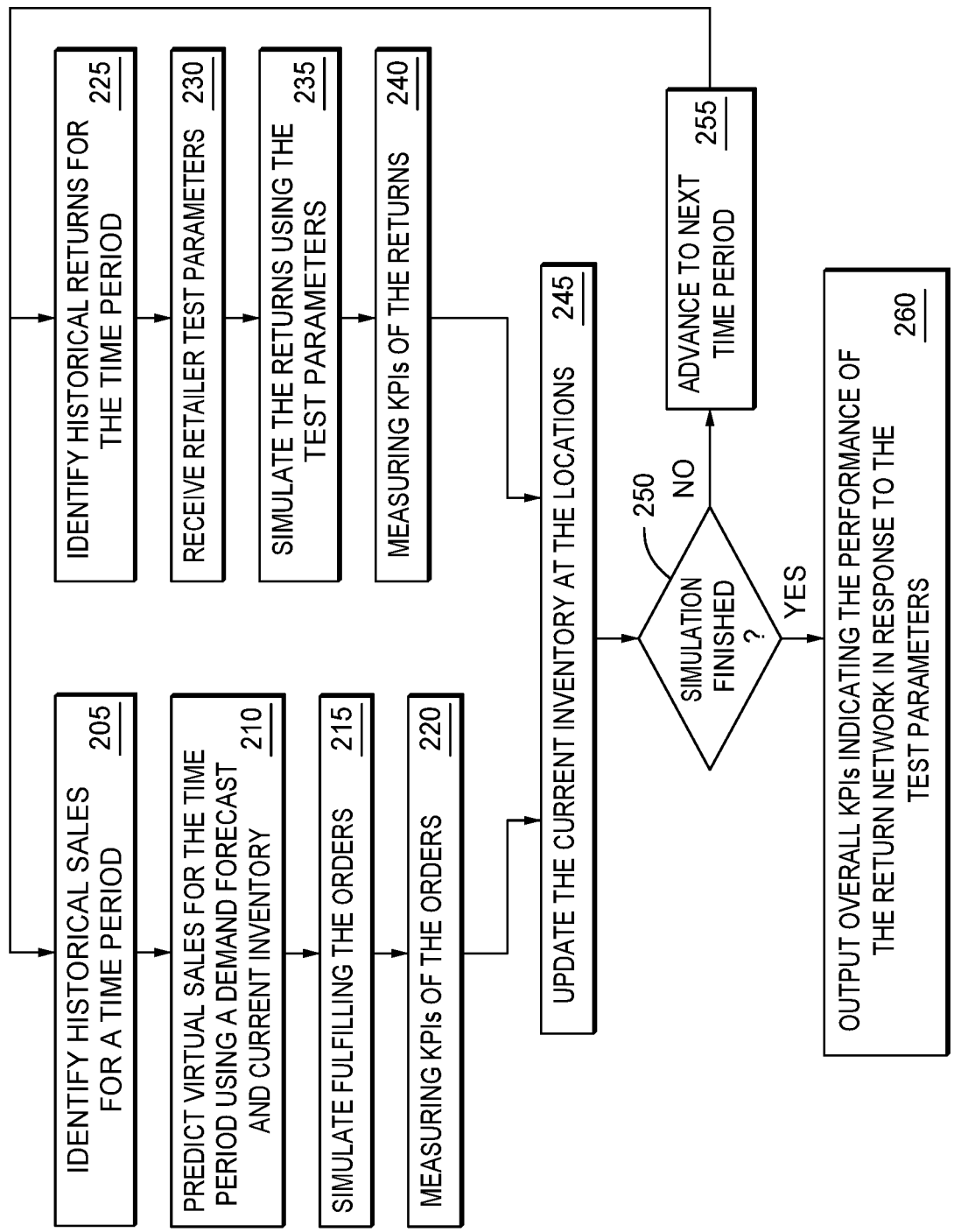
FIG. 2 is a flowchart for simulating a change in a return network, according to one embodiment described herein.

FIG. 2 is a flowchart of a method 200 for simulating a change in a return network, according to one embodiment described herein. As shown, the method 200 includes two paths—a sale path defined by blocks 205-220 and a return path defined blocks 225-240—which can execute independently of each other. For example, the sale and return paths can execute in parallel to simulate returns and sales for a retailer.

At block 205, the fulfillment solver identifies historical sales for a time period. For example, the simulation system may receive the actual sales made during a previous three-month time period. These sales can include both walk-in sales and online sales.

At block 210, the fulfillment solver predicts virtual sales for the time period using a demand forecast and current inventory. In one embodiment, the virtual sales are predicted walk-in sales. As mentioned above, changes to the return network can affect the inventory at the retailer's stores. Thus, stores that ran out of inventory during the time period may instead have additional inventory in the simulation. Based on the demand forecast, the fulfillment solver can predict whether this extra inventory would likely have resulted in a virtual sale. However, the demand forecast may indicate that this extra inventory would not have resulted in an additional sale, and the returned items may have to be sold at a discount, or incur the expense of transferring these items to a different store.

Further, changes to the decisions made by the return solver can mean that actual sales occurring during the time period may not occur during the simulation (e.g., if the a location ran out of the item due to changed decisions made by the return solver). Thus, the virtual sales can be negative indicating a loss of sales, in which case the total number of sales predicted by the simulation system may be less than the number of historical sales.

At block 215, the fulfillment solver simulates fulfilling the orders. That is, for online sales, the fulfillment solver uses predefined logic to determine, based on current available inventory levels and shipping costs, which location to use to ship the ordered item to the customer. For walk-in sales, the fulfillment solver can determine which of the historical sales will occur and whether those sales are affected (either positively by new sales occurring or negatively by fewer sales occurring) by the changes in inventory caused by the decisions made by the return solver.

At block 220, the simulation system measures KPIs of the orders such as the revenue generated, shipping costs, transfer costs, and the like.

Turning to the return path, at block 225, the return solver identifies historical returns for the time period. In one embodiment, the simulation system assumes that the return orders for the simulation are the same as the historical (i.e., actual) return orders for the same time period. The simulation system can use the information in the historical return orders (e.g., customer ID, customer address, number of items, types of items, etc.) as an input to the return solver.

At block 230, the return solver receives test parameters from the retailer defining a change to the retailer's return network. As mentioned above, the test parameters may change the number of candidate return locations in the return network, or a change a return policy such as permitting a certain item to be returned to a limited number of the candidate return locations in the return network. In any case, the test parameters can change how the return solver determines which candidate return location to use for receiving the return order.

At block 235, the return solver simulates the returns using the test parameters. That is, using the information in the historical orders and the constraints defined in the test parameters, the return solver uses predefined logic to select one of the candidate return locations for receiving the return items. The details of different metrics the return solver can use to make this decision are described in more detail below.

At block 240, the simulation system measures KPIs corresponding to the returns such as return shipping cost, transfer costs, handling costs, inventory changes, and the like. These KPIs can be combined with the KPIs identified at block 220 in the sale path.

At block 245, the inventory manager updates the current inventory at the retailer's locations that are affected by the decisions made by the fulfillment solver at block 215 and the return solver at block 235. That is, the simulation system can update the simulated inventory at the various stores, distribution centers, and kiosks that store inventory for the retailer. These locations can include the locations in the retailer's return network as well as locations that are not candidate return locations. Further, for return orders, the inventory manager may not update the inventory immediately at the selected return location since there is a delay to account for the time the customer mails the return item and when it is received at the selected return location. In this manner, the simulation system can accurately track the inventory at the various locations storing items for the retailer so that return solver and fulfillment solver can make more accurate decisions as the simulation continues.

At block 250, the simulation system determines whether the simulation is finished—i.e., whether the simulation has reached the end time period (e.g., the last day in a two-month simulation time period). If not, the method 200 proceeds to block 255 where the simulation advances to the next time period (e.g., the next day in the two-month time period) and repeats blocks 205-245 using the updated inventory data and the historical sales and returns for that time period.

If the simulation is finished, the method 200 proceeds to block 260 where the simulation system outputs overall KPIs indicating the performance of the return network in response to the test parameters. The retailer can evaluate these KPIs to determine whether the test parameters had a desired effect—e.g., reduced total shipping costs, improved sales, reduced staff costs, increased return efficiency, etc. If so, the retailer can implement those changes in the actual return network. If not, the retailer can tweak the test parameters and re-run the simulation to determine whether the desired effect occurs.

Figure 3:
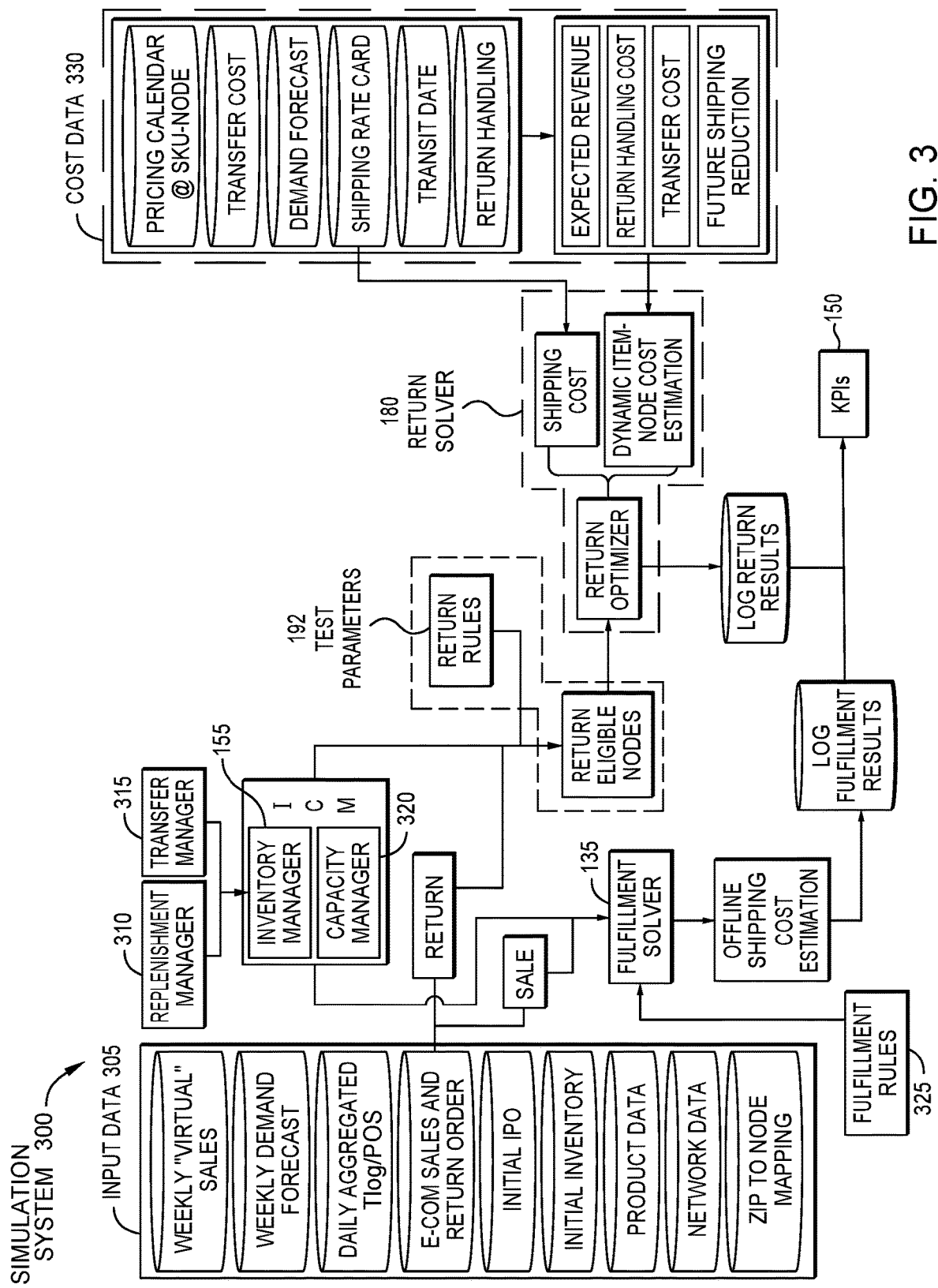
FIG. 3 illustrates a return network simulation system, according to one embodiment described herein.

FIG. 3 illustrates a return network simulation system 300, according to one embodiment described herein. Like the simulation system 100, the simulation system 300 includes a return path (that includes test parameters 192 and return solver 180) and a sale path (that includes the fulfilment solver 135 and fulfillment rules 325). But the simulation system 300 also includes other components such as a replenishment manager 310, a transfer manager 315, a capacity manager 320, and various other types of input data 305 and cost data 330 which are not necessary, but may be advantageous to include in the simulation system 300 for the reasons provided below.

The input data 305 includes various metrics that can be used as inputs into the sale and return paths in the simulation system 300. The weekly "virtual" sales may be calculated by a sale predictor (not shown in FIG. 3) that uses a weekly demand forecast for each store and current inventory levels at those stores (as tracked by the inventory manager 155) to predict whether a store would make an additional sale or lose a sale during the simulation time period, when compared to the actual, historical sales at that store. The daily aggregated T log/point-of-sale (POS) indicates the actual walk-in sales at the retailer's stores. The E-com sales and return order indicate the number of online sales and the number of returns (made via the mail rather than in-person at a store) during the simulation time period. The initial purchase orders (PO) indicates the POs that may be in-flight to the retailer's stores when the simulation begins. That is, the initial PO could include returns that have been started but have not yet reached the return locations at the beginning of the simulation time period, or a transfer between two of the retailer's locations is still in progress. The initial inventory indicates the current inventory of items sold by the retailer at its locations at the beginning of the simulation. The product data can include information about the items such as price and weight (e.g., a pricing calendar). The network data can provide information about the return network such as the locations, their geographic locations, etc. Finally, the zip to node mapping indicates what zip code are matched to which of the retailer's location. For example, these mapping may indicate, based on the customer's zip code, which location should be used to fulfill the customer's order. This input data 305 can be used in the sale and return paths in order to fulfill customer orders and process return orders.

The replenishment manager 310 (or replenishment predictor) predicts when a store's inventory needs to be resupplied from a distribution center. The transfer manager 315 (or transfer predictor) predicts when items need to be transferred between distribution centers to avoid demand-supply imbalance. Thus, the replenishment manager 310 predicts when stores (which sell goods to walk-in customers) need additional inventory while the transfer manager 315 predicts when inventory will be transferred between distribution centers. As shown in FIG. 3, the decisions made by the replenishment manager 310 and the transfer manager 315 are forwarded to the inventory manager 155 so it can update the inventory at the retailer's stores and distribution center. As discussed below, the decisions made by the replenishment manager 310 and the transfer manager 315 can be affected by the changes in the test parameters 192. Thus, the historical (or actual) decisions made by the managers 310, 315 may be different from the decisions these managers 310, 315 make during the simulation, which is why it is advantageous to include these managers 310, 315 in the simulation system 300.

The capacity manager 320 simulates the capacity of each of the candidate return locations in the return network to process return orders. For example, the candidate return locations may have different numbers of staff assigned to process returns, different levels of training for those staff members, different equipment for processing returns, and the like. As a result, the capacity of the candidate return locations to process returns can differ. Further, as the return solver 180 selects a location to receive return items, its capacity to process additional items may decrease. As such, the capacity manager 320 can track this capacity during a simulation which can help the return solver 180 to make more optimal decisions.

The fulfillment solver 135 uses the fulfillment rules 325, the input data 305, and the available inventory provided by the inventory manager 155 to determine how to fulfill online orders. There are many different techniques for implementing the fulfillment solver 135 and fulfillment rules 325. The embodiments herein are not limited to any particular implementation of the solver 135 and the rules 325. Once the shipped orders are determined, the simulation system 300 can calculate an offline shipping cost estimation for fulfilling the orders which is then logged. Although not shown in FIG. 3, the decisions made by the fulfillment solver 135 can be sent to the inventory manager 155 to update the inventory at the various locations.

In this example, the test parameters 192 include return eligible nodes and return rules which represent changes that can be made to the return network. For example, the retailer can change the number of return eligible nodes (i.e., the candidate return locations) by increasing or decreasing the number of return locations, or change which items can be returned to which location in the return network. In this manner, the retailer can simulate changes to the physical return network and its return policy using the simulation system 300.

In this embodiment, the return solver 180 uses cost data 330 to calculate return shipping cost and a dynamic item-node cost estimation. For example, the return solver 180 can use a shipping rate card to determine the return shipping cost for a return order to each of the candidate return locations from the customer's location.

In addition to the shipping rate card, the cost data 330 also includes a pricing calendar indicating how the prices of items sold by the retailer change over time (e.g., when the items are normally priced versus on sale), inventory transfer cost data indicating the amount it costs to transfer the items being offered to sale from one location in the retailer's network to another location, demand forecast indicating the online and walk-in demand for an item, transit data indicating the transit times for sending different packages to different locations via different modes (e.g., for one origin-destination pair it may take 3 days versus 2 days for another). The transit times may not be purely distance-based and can depend on the shipping carrier—e.g., two location might be farther apart but located right along the highway on a regular route between hubs, so may have fewer transit days. The cost data 330 also includes return handling cost data indicating the cost incurred for processing the returned items so they are in a state ready for re-sell. The return handling cost data can vary between locations; for example, a store may have only one person assigned to process returned items with little specialized training and infrastructure to help. However, a re-packing center or distribution center may have several individuals with special training for processing returned items for re-sell.

The cost data 330 can be used to calculate the expected revenue, return handling cost, transfer cost, and future shipping reduction corresponding to each candidate location and for each item. In one embodiment, the expected revenue is computed based on combining expected inventory picture and expected pricing calendar data at a particular location in the return network. The return handling cost data indicates the cost incurred for processing the returned items so they are in a state ready for re-sell. The transfer costs can be an operation transfer cost that defines the cost for moving the items from the return location to a different location in the retailer's network. This cost can include retrieving (or picking) the item from the location, transferring the item to a new location in the network, processing the item at the new location, and putting away the item at the new location. For example, the operational transfer costs for a distribution center are generally smaller than at a physical store since the distribution center is designed for the easy retrieval of items and moving those items to a different location. Thus, if it is likely an item will be transferred in the future (i.e., after it has been received at a return location), a location having a higher operational transfer costs will generally have a worse net expected recovery than a location with a lower operational transfer cost.

The future shipping reduction may be an expected demand imbalance transfer cost which is a predicted cost related to having to move the returned items to a different location in response to demand imbalance. The advantage of considering the expected demand imbalance transfer cost when calculating the net expected recovery is that doing so increases the likelihood the items are returned to a location (e.g., a distribution center) with demand deficit so as to avoid inventory transfer. Thus, the expected demand imbalance transfer cost may increase as the inventory of the item at a particular location increases. However, this can be offset if the demand for the item at the location is also high. That is, even if the location has a very high inventory of an item, if it also has high demand, then the expected demand imbalance transfer cost may be low. However, if the location has high inventory but low demand, then the expected demand imbalance transfer cost may be high since the likelihood that a transfer of the items may need to be performed in the future increases. Thus, assigning a high expected demand imbalance transfer cost reduces the chance the location is selected as the return location, and thus, reduces the chance that an imbalance transfer will occur in the future.

The expected revenue, return handling cost, transfer cost, and future shipping reduction can be combined to yield the dynamic item-node cost estimation. A return optimizer can then use the shipping cost and the dynamic item-node cost estimation to select one of the candidate return locations to receive the return order. However, the metrics provided in the return solver 180 are just one example of data and techniques that can be used to select a return location for a return order. The embodiments herein are not limited to any particular implementation of the return solver 180. That is, the simulation system 300 can be used to simulate changes in a retailer's return network regardless of the particular technique the retailer uses to decide how to route return orders in its return network. Once a return order is processed by the simulation system 300, the results are logged and can then be used to calculate the KPIs 150. Moreover, although not shown, the results can be used to update the inventory of the return locations (albeit with some delay to account for the time required for the items to be mailed to the return locations).

Figure 4:
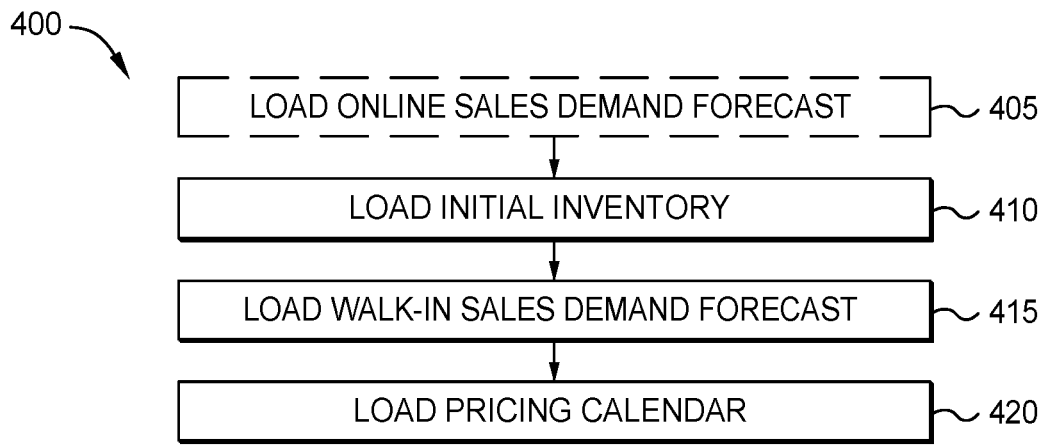
FIG. 4 is a flowchart for initializing a return network simulation system, according to one embodiment described herein.

FIG. 4 is a flowchart of a method 400 for initializing a return network simulation system, according to one embodiment described herein. Optionally, at block 405, the simulation system loads online sales demand forecast. In some scenarios, the online sale demand forecast can affect the number of online sales that occur during a simulation. That is, the number of actual online sales during a historical time period may not match the number of simulated online sales for that same historical time period because of changes made to the return network. However, in other scenarios, the online sales in the simulation may be assumed to be the same as the number of actual online sales, in which case, block 405 can be omitted.

At block 410, the simulation system loads initial inventory indicating the amount of each item sold by the retailer that is currently in each of the retailer's location. These locations can include storefronts, kiosks, distribution centers and the like. Moreover, the simulation system may track inventory of stores that are in, as well as those that are not in, the return network.

At block 415, the simulation system loads walk-in sale demand forecast for each store. The demand forecast can indicate whether there is a change in walk-in sales in response to the changes made to the return network when executing the simulation.

At block 420, the simulation system loads pricing calendars for the items sold by the retailer. Generally, the pricing calendars indicate the price the items are sold at during the simulation time period. The pricing calendars may be specific to a store or a geographic region. That is, the items may be sold at different prices at the different stores.

Figure 5:
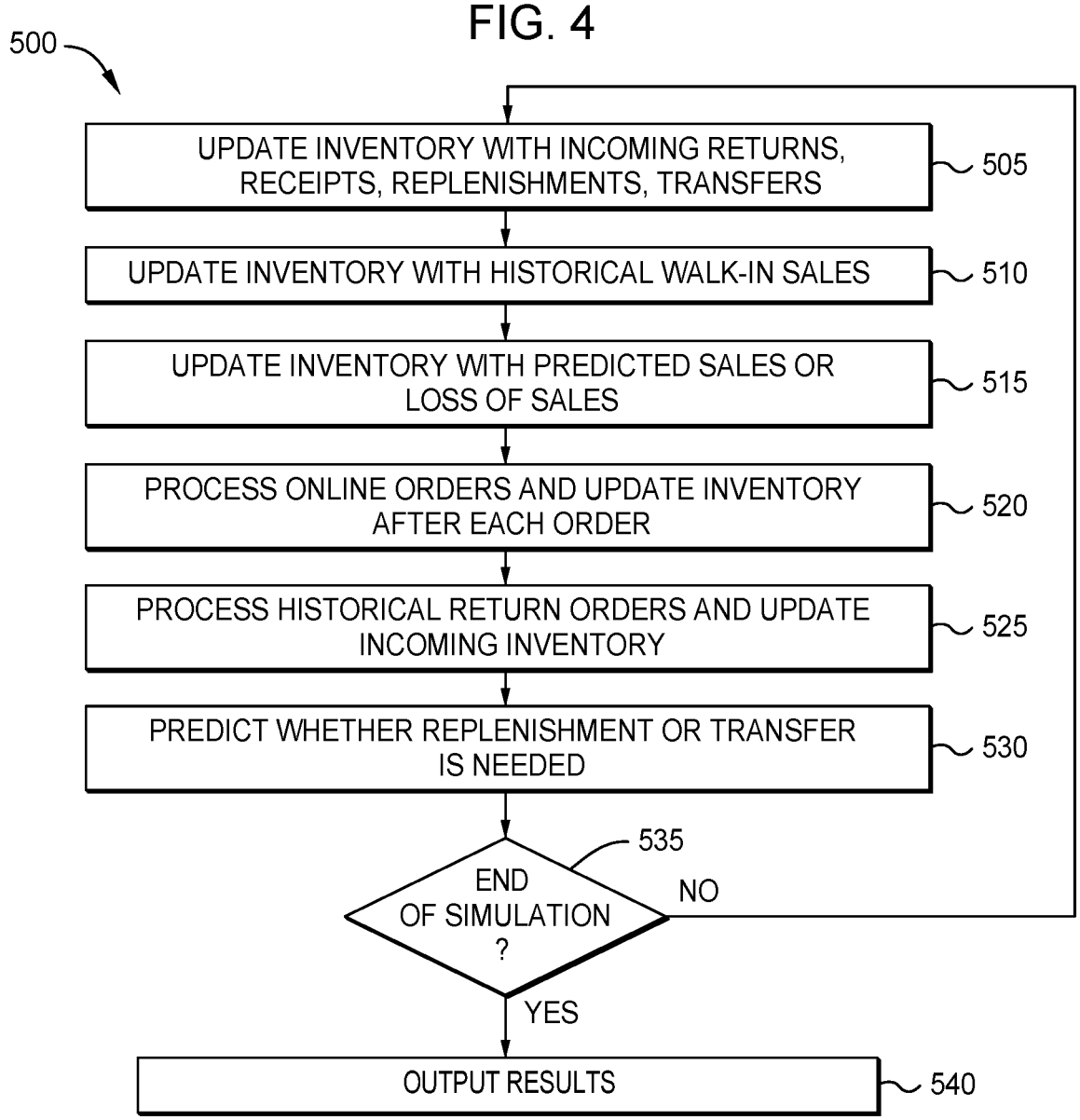
FIG. 5 is a flowchart for simulating a change in a return network, according to one embodiment described herein.

FIG. 5 is a flowchart of a method 500 for simulating a change in a return network, according to one embodiment described herein. At block 505, the simulation system updates inventory at the retailer's locations with incoming returns, receipts (i.e., sales), replenishments, and transfers. That is, for every day in the simulation time period, the simulation system updates the inventory as the locations receive additional inventory, whether that inventory originated from a return, receipt, replenishment, or transfer.

As discussed later in the method 500, the replenishment, transfer, and return decisions may have occurred when the simulation system simulated previous days in the simulation time period. If this is the first few days of the simulation time period, the data for updating the inventory at block 505 may be primarily based on the historical data received from the retailer. However, as the simulation continues, the updated inventory at each day may be different than the historical data as a result of the changes in the return network altering the decisions made by the other components in the simulation system (e.g., the replenishment manager, the transfer manager, or the number of walk-in sales).

At block 510, the simulation system updates the inventory with historical walk-in sales. That is, the simulation system uses historical data to determine how many actual walk-in sales were made that day in the simulated time period.

At block 515, the simulation system updates the inventory with predicted sales (i.e., virtual sales) or loss of sales. That is, as the changes to the return network change the inventory at the stores, this can affect the number of walk-in sales (depending on the demand at those stores). Thus, changing the return number can mean a store makes additional virtual sales that it would have not made otherwise, or cause a store to lose a sale because it ran out of inventory when it did not run out of the item in real-life.

At block 520, the fulfillment solver processes online orders and updates the inventory after each order. In one embodiment, the fulfillment solver assumes that the number of online orders on each day is the same as the number of actual orders on that day. However, this might not be the case. For example, the simulation system may have been provided with the online sale demand forecast so a sale predictor can predict how changing inventory may change the number of online sales made in a day. In one embodiment, it is assumed that fulfilling the orders has an immediate (or almost immediate) effect on the inventory.

At block 525, the return solver processes historical return orders and updates incoming inventory. That is, the return solver decides an optimal return location for each of the historical return orders. However, it may be several days before the returned items actually arrive at the return locations. For example, the customer may delay mailing the items, and it takes some time before the items reach the return location via mail. Thus, the inventory manager may initiate a PO indicating an item is on its way to a return location and use a predefined number (e.g., 7 days) to indicate when it actually arrives in the simulation.

At block 530, the replenishment manager and transfer manager predict whether replenishment or transfer is needed. That is, the replenishment manager and transfer manager in the simulation system may use the same logic as the actual replenishment manager and transfer manager to determine whether to replenish the inventory at a store or to perform a transfer. Because the changes in the return network can change the inventory at the retailer's locations, the decisions by the replenishment manager and transfer manager during the simulation may be different than the decisions made by the actual replenishment manager and transfer manager.

Although any logic can be used to implement the replenishment manager, in one embodiment, the replenishment manager makes a replenishment decision once a week at fixed time. The replenishment manager can set, for each location, a fixed, predefined source location where inventory can be received. For example, the source location may have items packaged in bulk (e.g., a distribution center). If total need is less than the drainable inventory for a source location, then all need is met. If total need is greater than drainable inventory, the replenishment manager can use arbitration logic to determine which locations is replenished. After making the decision, inventory transfer is started immediately. The simulation system can assigned a fixed delay to a replenishment shipment—e.g., seven days—to account for processing and travel time.

Although any logic can be used to implement the transfer manager, in one embodiment, the transfer manager initiates a transfer only if the level of inventory is below a threshold. The transfer manager can also use weekly demand forecasts adjusted by the number of return orders arriving at the location, a weekly projected inventory level, and weekly purchase orders to determine whether a transfer is required.

The simulation system can assigned a fixed delay to a transfer shipment—e.g., seven days—to account for processing and travel time.

At block 535, the simulation system determines whether to end the simulation—e.g., if it has simulated the last day in the simulation time period. If not, the method 500 returns to block 505 where the decisions made in the previous days are used to update the current inventory. If the simulation has ended, the method 500 proceeds to block 540 where the simulation system outputs results (e.g., KPIs) for the retailer.

Figure 6:
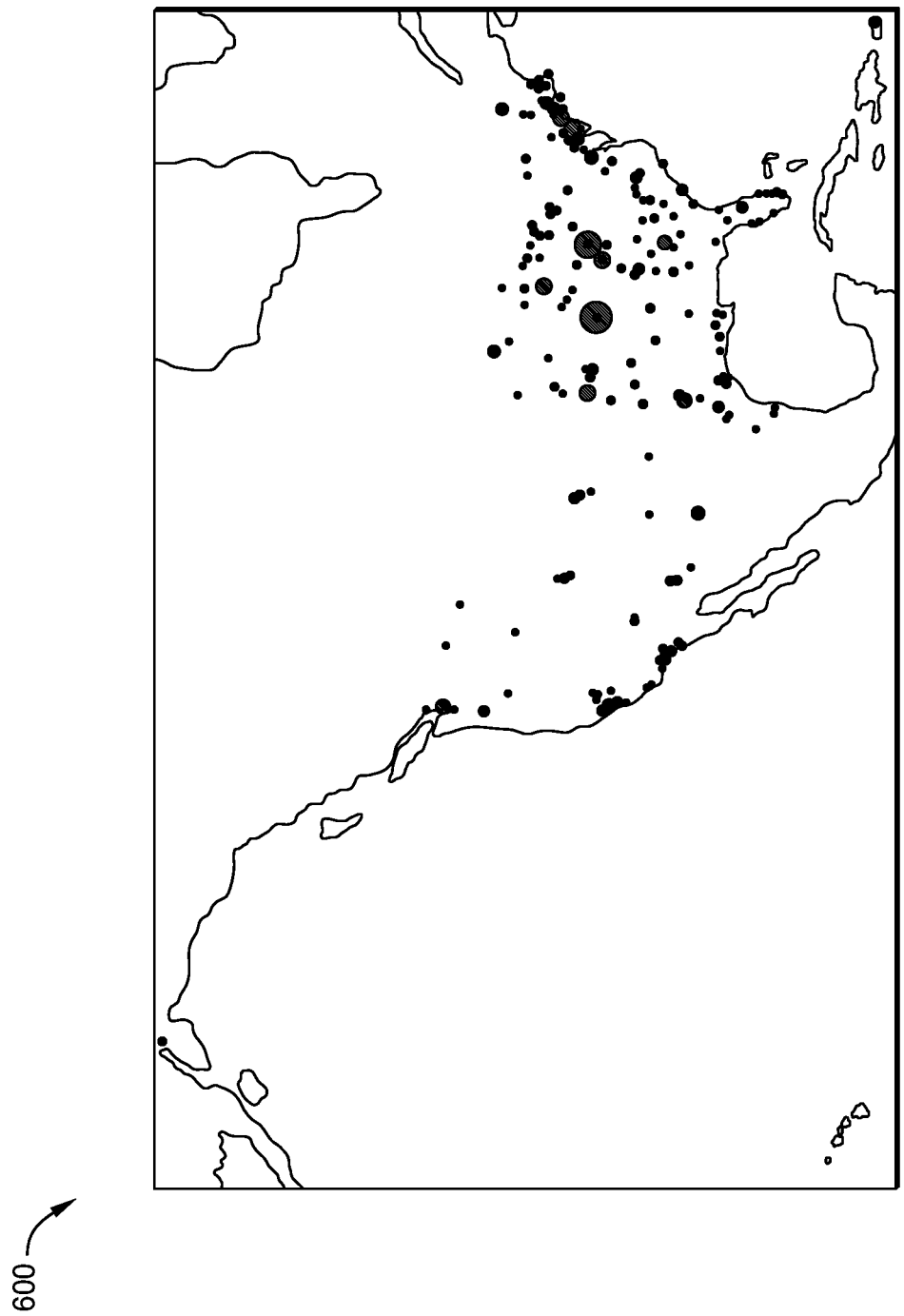
FIG. 6 is an illustration of a graphical user interface illustrating results of simulating a change in a return network, according to one embodiment described herein.

FIG. 6 is an illustration of a graphical user interface (GUI) 600 illustrating results of simulating a change in a return network, according to one embodiment described herein. The GUI 600 illustrates different locations of a retailer's return network (indicated by the dots). The size of the dots represent the number of items returned to those locations. The GUI 600 is just one example of presenting the results of simulating a change to the retailer's network to the retailer. The retailer can evaluate the GUI 600 to determine how a change to the return network affects the distribution of the return items among the locations in the return network.

As mentioned above, the simulation system permits a retailer to execute multiple simulations to try out multiple different scenarios easily and quickly. That is, the retailer can change the test parameters so that the system simulates a different change to the return network. Each simulation can generate KPIs which can be displayed in various ways using the GUI 600. In one embodiment, the GUI 600 can display results from multiple simulations at the same time (with their different KPIs). This enables the different changes to be easily compared—e.g., showing KPIs side-by-side with deep-diving into details to see the root cause of differences between the simulations. This enables the retailer to quickly try different what-if scenarios, see how they compare, and pick the best configurations for its return network.

Figure 7:
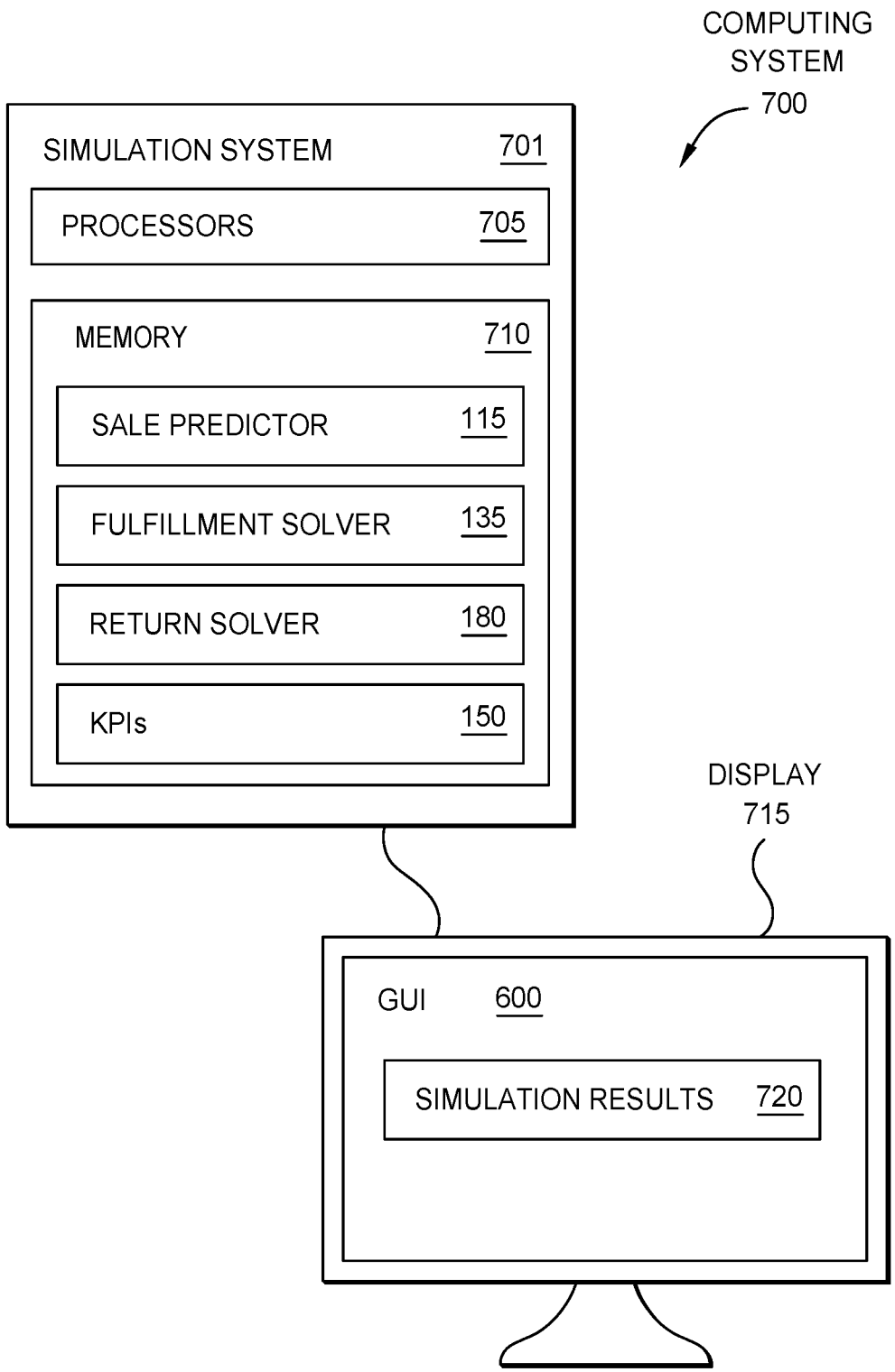
FIG. 7 is a block diagram of a computing system for implementing a return network simulation system, according to one embodiment described herein.

FIG. 7 is a block diagram of a computing system 700 for implementing a return network simulation system, according to one embodiment described herein. The computing system 700 includes a simulation system 701 which can be the simulation system 100 in FIG. 1 or the simulation system 300 in FIG. 3. The simulation system 701 includes processors 705 that represents any number of processing elements which each can include any number of processing cores. The simulation system 701 also includes memory 710 which can be volatile memory, nonvolatile memory, or combinations thereof. The memory 710 includes the sale predictor 115, the fulfillment solver 135, and the return solver 180 which may be software applications that are executed using the processors 705. The memory 710 also stores the KPIs 150 which are generated from executing the simulation system 701.

The display 715 can be a monitor or television that displays the GUI 600 that illustrates simulation results 720 of the simulation system 701. The simulation results 720 may be the KPIs 150 or metrics or graphical images derived from the KPIs 150. A retailer can use the computing system 700 to execute the simulation system 701 and then view the result 720 in the GUI 600. If not satisfied by the results 720, the retailer can then use an application programming interface (API) (not shown) to tweak the test parameters to change the return network and perform another simulation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements discussed above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:

receiving a test parameter defining a change to a return network of a retailer in a historical time period, wherein the return network comprises a plurality of candidate return locations, and wherein the test parameter comprises at least one of adding a first return location of the plurality of candidate return locations, removing a second return location of the plurality of candidate return locations, or updating a return policy;

simulating, for the historical time period and using one or more computer processors, a plurality of return orders based on the test parameter and the return network by selecting which of the plurality of candidate return locations receive items corresponding to the plurality of return orders, wherein the plurality of return orders are actual orders that were processed by the return network during the historical time period;

updating, using the one or more computer processors, inventories at the plurality of candidate return locations based on simulating the plurality of return orders, wherein one or more of the updated inventories are altered relative to actual inventories at the plurality of candidate return locations during the historical time period;

predicting, using the one or more computer processors, virtual sales at the plurality of candidate return locations based on the updated inventories and a demand forecast corresponding to the plurality of candidate return locations, wherein the virtual sales are sales that are predicted to have occurred during the historical time period if the return network was changed according to the test parameter;

generating, using the one or more computer processors, one or more key performance indicators (KPIs) based on simulating the plurality of return orders and predicting the virtual sales;

changing the test parameter using an application programming interface (API) before re-running the simulation for the historical time period using the changed test parameter; and generating a graphical user interface (GUI) for display comprising graphical images derived from the KPIs, wherein:
the graphical images are illustrated as dots;
a size of a dot indicates a number of items returned to a particular return location; and
a larger dot indicates a greater number of returns at the particular return location.

2. The method of claim 1, further comprising:
simulating fulfilling the virtual sales; and
updating the inventories at the plurality of candidate return locations based on fulfilling the virtual sales.

3. The method of claim 1, further comprising:
determining during simulation that one of the plurality of candidate return locations should be replenished based on the updated inventories; and
updating, after a predefined delay to simulate transit time, the inventories at the plurality of candidate return locations in response to the replenishment.

4. The method of claim 1, further comprising:
determining during simulation that inventory should be transferred from one of the plurality of candidate return locations to another one of the plurality of candidate return locations based on the updated inventories; and
updating, after a predefined delay to simulate transit time, the inventories at the plurality of candidate return locations based on the transfer.

5. The method of claim 1, further comprising:
predicting a loss of a sale at one of the plurality of candidate return locations based on the updated inventories, wherein the loss of the sale predicts that an actual sale occurring during the historical time period would not have happened if the return network was changed according to the test parameter.

6. The method of claim 1, wherein simulating the plurality of return orders based on the test parameter and the return network, updating inventories at the plurality of candidate return locations based on simulating the plurality of return orders, and predicting virtual sales at the plurality of candidate return locations are performed for each day of the historical time period, wherein the plurality of return orders are actual orders that were processed by the return network during each day of the historical time period.

7. The method of claim 1, further comprising:
receiving, after generating the GUI, a second test parameter defining a different change to the return network;
simulating the plurality of return orders again based on the second test parameter and the return network, thereby generating second KPIs; and
updating the GUI to display both (i) the graphical images derived from the KPIs and (ii) graphical images derived from the second KPIs for side-by-side comparison.

8. A system, comprising:
a processor; and
memory comprising a program, which when executed by the processor performs an operation, the operation comprising:
receiving a test parameter defining a change to a return network of a retailer in a historical time period, wherein the return network comprises a plurality of candidate return locations, and wherein the test parameter comprises at least one of adding a first return location of the plurality of candidate return locations, removing a second return location of the plurality of candidate return locations, or updating a return policy;
simulating, for a historical time period, a plurality of return orders based on the test parameter and the return network by selecting which of the plurality of candidate return locations receive items corresponding to the plurality of return orders, wherein the plurality of return orders are actual orders that were processed by the return network during the historical time period;
updating inventories at the plurality of candidate return locations based on simulating the plurality of return orders, wherein one or more of the updated inventories are altered relative to actual inventories at the plurality of candidate return locations during the historical time period;
predicting virtual sales at the plurality of candidate return locations based on the updated inventories and a demand forecast corresponding to the plurality of candidate return locations, wherein the virtual sales are sales that are predicted to have occurred during the historical time period if the return network was changed according to the test parameter;
generating one or more KPIs based on simulating the plurality of return orders and predicting the virtual sales;
changing the test parameter using an application programming interface (API) before re-running the simulation for the historical time period using the changed test parameter; and
generating a graphical user interface (GUI) for display comprising graphical images derived from the KPIs, wherein:
the graphical images are illustrated as dots;
a size of a dot indicates a number of items returned to a particular return location; and
a larger dot indicates a greater number of returns at the particular return location.

9. The system of claim 8, wherein the operation comprises:
simulating fulfilling the virtual sales; and
updating the inventories at the plurality of candidate return locations based on fulfilling the virtual sales.

10. The system of claim 8, wherein the operation comprises:
determining during simulation that one of the plurality of candidate return locations should be replenished based on the updated inventories; and
updating, after a predefined delay to simulate transit time, the inventories at the plurality of candidate return locations in response to the replenishment.

11. The system of claim 8, wherein the operation comprises:
determining during simulation that inventory should be transferred from one of the plurality of candidate return locations to another one of the plurality of candidate return locations based on the updated inventories; and
updating, after a predefined delay to simulate transit time, the inventories at the plurality of candidate return locations based on the transfer.

12. The system of claim 8, wherein the operation comprises:
predicting a loss of a sale at one of the plurality of candidate return locations based on the updated inventories, wherein the loss of the sale predicts that an actual sale occurring during the historical time period would not have happened if the return network was changed according to the test parameter.

13. The system of claim 8, wherein simulating the plurality of return orders based on the test parameter and the return network, updating inventories at the plurality of candidate return locations based on simulating the plurality of return orders, and predicting virtual sales at the plurality of candidate return locations are performed for each day of the historical time period, wherein the plurality of return orders are actual orders that were processed by the return network during each day of the historical time period.

14. The system of claim 8, wherein the operation comprises:
   receiving, after generating the GUI, a second test parameter defining a different change to the return network;
   simulating the plurality of return orders again based on the second test parameter and the return network, thereby generating second KPIs; and
   updating the GUI to display both (i) the graphical images derived from the KPIs and (ii) graphical images derived from the second KPIs for side-by-side comparison.

15. A computer program product for selecting a return location for an item to be returned via mail, the computer program product comprising:
   a computer readable storage medium having computer readable program code embodied therewith, the computer readable program code executable by one or more computer processors to perform an operation, the operation comprising:
      receiving a test parameter defining a change to a return network of a retailer in a historical time period, wherein the return network comprises a plurality of candidate return locations, and wherein the test parameter comprises at least one of adding a first return location of the plurality of candidate return locations, removing a second return location of the plurality of candidate return locations, or updating a return policy;
      simulating, for a historical time period, a plurality of return orders based on the test parameter and the return network by selecting which of the plurality of candidate return locations receive items corresponding to the plurality of return orders, wherein the plurality of return orders are actual orders that were processed by the return network during the historical time period;
      updating inventories at the plurality of candidate return locations based on simulating the plurality of return orders, wherein one or more of the updated inventories are altered relative to actual inventories at the plurality of candidate return locations during the historical time period;
      predicting virtual sales at the plurality of candidate return locations based on the updated inventories and a demand forecast corresponding to the plurality of candidate return locations, wherein the virtual sales are sales that are predicted to have occurred during the historical time period if the return network was changed according to the test parameter;
      generating one or more key performance indicators (KPIs) based on simulating the plurality of return orders and predicting the virtual sales;
      changing the test parameter using an application programming interface (API) before re-running the simulation for the historical time period using the changed test parameter; and
      generating a graphical user interface (GUI) for display comprising graphical images derived from the KPIs, wherein:
         the graphical images are illustrated as dots;
         a size of a dot indicates a number of items returned to a particular return location; and
         a larger dot indicates a greater number of returns at the particular return location.

16. The computer program product of claim 15, wherein the operation comprises:
   simulating fulfilling the virtual sales; and
   updating the inventories at the plurality of candidate return locations based on fulfilling the virtual sales.

17. The computer program product of claim 15, wherein the operation comprises:
   determining during simulation that one of the plurality of candidate return locations should be replenished based on the updated inventories; and
   updating, after a predefined delay to simulate transit time, the inventories at the plurality of candidate return locations in response to the replenishment.

18. The computer program product of claim 15, wherein the operation comprises:
   determining during simulation that inventory should be transferred from one of the plurality of candidate return locations to another one of the plurality of candidate return locations based on the updated inventories; and
   updating, after a predefined delay to simulate transit time, the inventories at the plurality of candidate return locations based on the transfer.

19. The computer program product of claim 15, wherein the operation comprises:
   predicting a loss of a sale at one of the plurality of candidate return locations based on the updated inventories, wherein the loss of the sale predicts that an actual sale occurring during the historical time period would not have happened if the return network was changed according to the test parameter.

20. The computer program product of claim 15, wherein the operation comprises:
   receiving, after generating the GUI, a second test parameter defining a different change to the return network;
   simulating the plurality of return orders again based on the second test parameter and the return network, thereby generating second KPIs; and
   updating the GUI to display both (i) the graphical images derived from the KPIs and (ii) graphical images derived from the second KPIs for side-by-side comparison.

* * * * *